United States Patent
Cuomo et al.

(10) Patent No.: US 9,544,356 B2
(45) Date of Patent: *Jan. 10, 2017

(54) MESSAGE SWITCH FILE SHARING

(71) Applicant: International Business Machines Corporation, Armonk, NY (US)

(72) Inventors: Gennaro A. Cuomo, Durham, NC (US); Dinakaran Joseph, Apex, NC (US); Victor S. Moore, Lake City, FL (US); Gregory L. Truty, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 14/154,375

(22) Filed: Jan. 14, 2014

(65) Prior Publication Data

US 2015/0200886 A1 Jul. 16, 2015

(51) Int. Cl.
*H04L 29/08* (2006.01)
*H04L 12/58* (2006.01)

(52) U.S. Cl.
CPC .............. *H04L 67/06* (2013.01); *H04L 51/34* (2013.01); *H04L 67/1097* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 6,058,389 A | * | 5/2000 | Chandra | G06F 17/30321 |
| 6,185,613 B1 | * | 2/2001 | Lawson | G06F 9/542 |
| | | | | 709/224 |
| 7,363,630 B2 | * | 4/2008 | Berkman | G06F 9/546 |
| | | | | 719/313 |
| 8,166,185 B2 | | 4/2012 | Samuel et al. | |
| 8,489,694 B2 | * | 7/2013 | Bhogal | H04L 67/104 |
| | | | | 709/206 |
| 8,554,846 B2 | * | 10/2013 | Brail | G06F 9/542 |
| | | | | 709/206 |
| 2002/0186260 A1 | * | 12/2002 | Young | G06F 21/604 |
| | | | | 715/853 |
| 2004/0139166 A1 | * | 7/2004 | Collison | G06F 9/542 |
| | | | | 709/207 |
| 2006/0146991 A1 | * | 7/2006 | Thompson | G06F 9/542 |
| | | | | 379/67.1 |

(Continued)

*Primary Examiner* — Thomas Dailey
*Assistant Examiner* — Aye M Aung
(74) *Attorney, Agent, or Firm* — Cantor Colburn LLP; Nicholas Bowman

(57) ABSTRACT

Embodiments relate to message switch file sharing. A file is accessed by a computer processor of a client producer device to share with a plurality of client consumer devices across a network. The computer processor partitions the file into a sequence of message payloads associated with a topic and a scheme. The scheme defines a sequence identifier to establish an order to reassemble the sequence of message payloads into the file. A sequence of messages is formed including the topic and the sequence of message payloads. The sequence of messages is published to a message queue associated with the topic in a message switch in the network. The message switch provides the client consumer devices with access to the sequence of message payloads based on subscriptions to the topic.

7 Claims, 5 Drawing Sheets

(56) References Cited

U.S. PATENT DOCUMENTS

| | | | |
|---|---|---|---|
| 2006/0155578 A1* | 7/2006 | Eisenberger | G06F 19/322 705/2 |
| 2007/0260742 A1* | 11/2007 | Clark | G11B 27/002 709/231 |
| 2008/0040503 A1* | 2/2008 | Kleks | H04L 63/145 709/236 |
| 2008/0256553 A1* | 10/2008 | Cullen | G06Q 30/02 719/313 |
| 2008/0294794 A1* | 11/2008 | Darugar | G06F 17/3089 709/238 |
| 2009/0228563 A1* | 9/2009 | Jones | G06F 9/526 709/206 |
| 2010/0131554 A1* | 5/2010 | Cooper | G06F 17/30578 707/770 |
| 2010/0281154 A1 | 11/2010 | Bedi et al. | |
| 2012/0233272 A1* | 9/2012 | Bedi | G06F 9/542 709/206 |
| 2014/0164529 A1* | 6/2014 | Kleppmann | H04L 29/08072 709/206 |

* cited by examiner

MESSAGE SWITCH FILE SHARING

BACKGROUND

The present disclosure relates to computer networks and, more specifically, to file sharing using a message switch.

A message switch is a device that supports publication and subscription to topics for sharing messages with many subscribers. Messages are typically limited to a relatively small payload for publishing information. The format of messages for a topic is determined by a scheme associated with message payloads. Each topic has a first-in-first-out (FIFO) message queue that stores message payloads to be shared with subscribers to the topic. A publisher produces a message associated with a topic and applies the associated scheme such that consumers of the message can receive the message for the subscribed topic and apply the associated scheme to interpret the payload of the message. Larger data objects, such as files, are not typically supported by message switches due to message size constraints and throughput limitations. For example, a message switch may ingest millions of messages per second across many thousands of users.

SUMMARY

According to an embodiment, a system for message switch file sharing is provided. The system includes a client producer device configured to communicate with a message switch in a network. The client producer device includes a computer processor configured to access a file to share with a plurality of client consumer devices across the network and partition the file into a sequence of message payloads associated with a topic and a scheme. The scheme defines a sequence identifier to establish an order to reassemble the sequence of message payloads into the file. The computer processor is also configured to form a sequence of messages including the topic and the sequence of message payloads. The computer processor is further configured to publish the sequence of messages to a message queue associated with the topic in the message switch in the network. The message switch provides the client consumer devices with access to the sequence of message payloads based on subscriptions to the topic.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
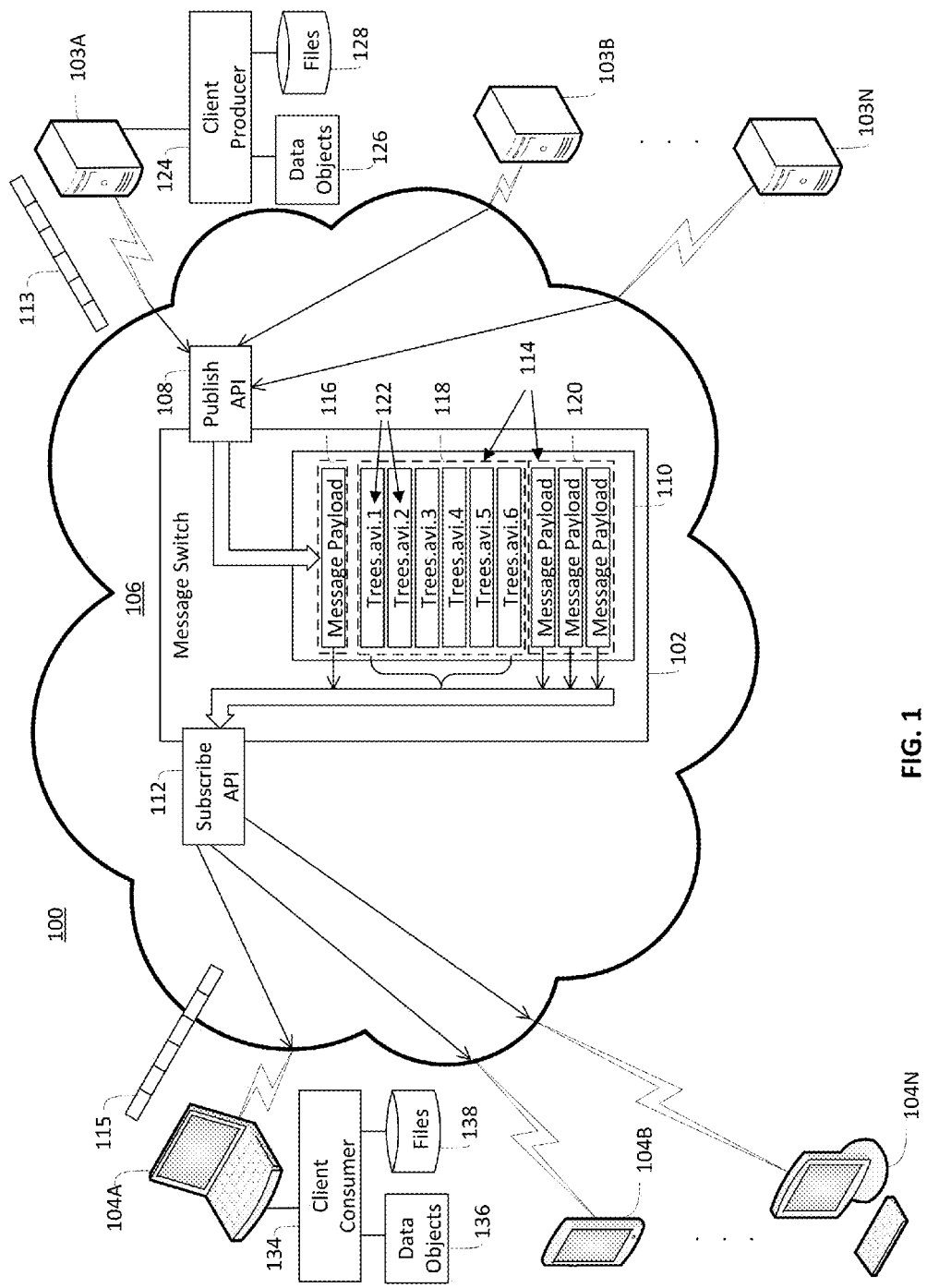
FIG. 1 depicts a block diagram of a system upon which message switch file sharing may be implemented according to an embodiment.

Exemplary embodiments relate to message switch file sharing in a network environment. Turning now to FIG. 1, an example of a system 100 upon which message switch file sharing may be implemented will now be described in greater detail. The system 100 represents a networked environment, such as the Internet, where millions of messages may pass through a message switch 102. In the example depicted in FIG. 1, the system 100 includes the message switch 102 configured to communicate with one or more client producer devices 103A-N and client consumer devices 104A-N over a network 106. The network 106 may be any type of communications network known in the art and can include a combination of wireless, wired, and/or fiber optic links. Although only one message switch 102 is depicted in the network 106, it will be understood that there can be multiple message switches which can interface with each other within the network 106 across a geographically wide area.

In exemplary embodiments, the message switch 102 is a high-speed processing device (e.g., a mainframe computer, an embedded computing device, or the like) including at least one processing circuit (e.g., a computer processor/CPU) capable of reading and executing instructions, and handling interactions with various components of the system 100. Alternatively, the message switch 102 can be embodied entirely in hardware including circuits and memory to perform processes as described herein. In the example of FIG. 1, the message switch 102 includes a publish application programming interface (API) 108 configured to interface the client producer devices 103A-N with one or more message queues 110, where only one message queue 110 is depicted in FIG. 1. The message switch 102 also includes a subscribe API 112 configured to interface the client consumer devices 104A-N with the one or more message queues 110. The one or more message queues 110 are implemented in memory of the message switch 102 as first-in-first-out (FIFO) queues to hold a plurality of message payloads 114.

In exemplary embodiments, the message payloads 114 are configured as single message objects or multiple message objects. For example, message object 116 in the message queue 110 of FIG. 1 includes a single message payload 114, message object 118 includes six message payloads 114 associated with a sequence of six messages, and message object 120 includes three message payloads 114. A sequence identifier 122, such as sequential numbers, can be used to establish an order to reassemble the message payloads 114 into a data object or file.

In exemplary embodiments, the client producer devices 103A-N and the client consumer devices 104A-N can include a variety of computing devices with processing circuits and I/O interfaces, such as a keys/buttons, a touchscreen, audio input, a display device and audio output. The client producer devices 103A-N and the client consumer devices 104A-N may be embodied in any type of computing device known in the art, such as a laptop, tablet computer, mobile device, personal computer, workstation, server, and the like. Accordingly, the client producer devices 103A-N and the client consumer devices 104A-N can include various computer/communication hardware and software technology known in the art, such as one or more processing units or circuits, volatile and non-volatile memory including removable media, power supplies, network interfaces, support circuitry, operating systems, and the like.

In exemplary embodiments, each of the client producer devices 103A-N includes a client producer 124 configured to send data objects 126 and/or files 128 in one or more messages to the message queues 110 of the message switch 102. The client producer 124 can be implemented in software, hardware, or a combination thereof. As described herein, the data objects 126 and files 128 can be used interchangeably, for instance a file may be a type of data object. In general, the data objects 126 may reside in volatile memory of the client producer devices 103A-N, and the files 128 may reside in non-volatile memory of the client producer devices 103A-N; however, embodiments are not so constrained. Similarly, each of the client consumer devices 104A-N includes a client consumer 134 configured to consume data objects 136 and/or files 138 from one or more messages of the message queues 110 in the message switch 102. The client consumer 134 can be implemented in software, hardware, or a combination thereof. As described herein, the data objects 136 and files 138 can be used interchangeably, for instance a file may be a type of data object. In general, the data objects 136 may reside in volatile memory of the client consumer devices 104A-N, and the files 138 may reside in non-volatile memory of the client consumer devices 104A-N. Accordingly, the client producer 124 can send a file or data object from the files 128 or data objects 126 to the message switch 102 via the publish API 108 as a sequence of messages 113 including message payloads 114 to be consumed by the client consumer 134 subscribed to the same topic. The client consumer 134 can receive a sequence of message payloads 115 including the message payloads 114 via the subscribe API 112. Message payloads 114 can be analyzed by the client consumer 134 for sequence identifiers 122 to establish an order to reassemble the sequence of message payloads 115 into a file, which can be stored in the data objects 136 or files 138 for further use.

In one example, the client producer 124 accesses a file named "trees.avi" from the data objects 126 or files 128 to share with one or more client consumer devices 104A-N across the network 106. The client producer 124 partitions the file into message payloads 114 associated with a topic, such as "films", and a scheme. A scheme may be used to define the sequence identifiers 122 for reassembling the message payloads 114 into the file. The client producer 124 forms a sequence of messages 113 that includes the topic and the message payloads 114. The sequence of messages 113 is published via the publish API 108 to message queue 110 associated with the topic as message object 118. The message switch 102 provides the client consumer devices 104A-N with access to the message payloads 114 based on subscriptions to the topic, in this example, "films". The client consumer devices 104A-N may be notified of the message payloads 114 by a callback notification or by polling the message queue 110 for new messages. The client consumer devices 104A-N can fetch the message payloads 114 as a single object, i.e., message object 118, or as individual payloads forming a sequence of message payloads 115. The sequence identifiers 122 can be used to determine which message to consume next to maintain order, and can also be useful if message consumption is stopped or paused before resuming at the last (i.e., most recently fetched) message payload 114 rather than restarting consumption at the beginning of the message payloads 114.

Figure 2:
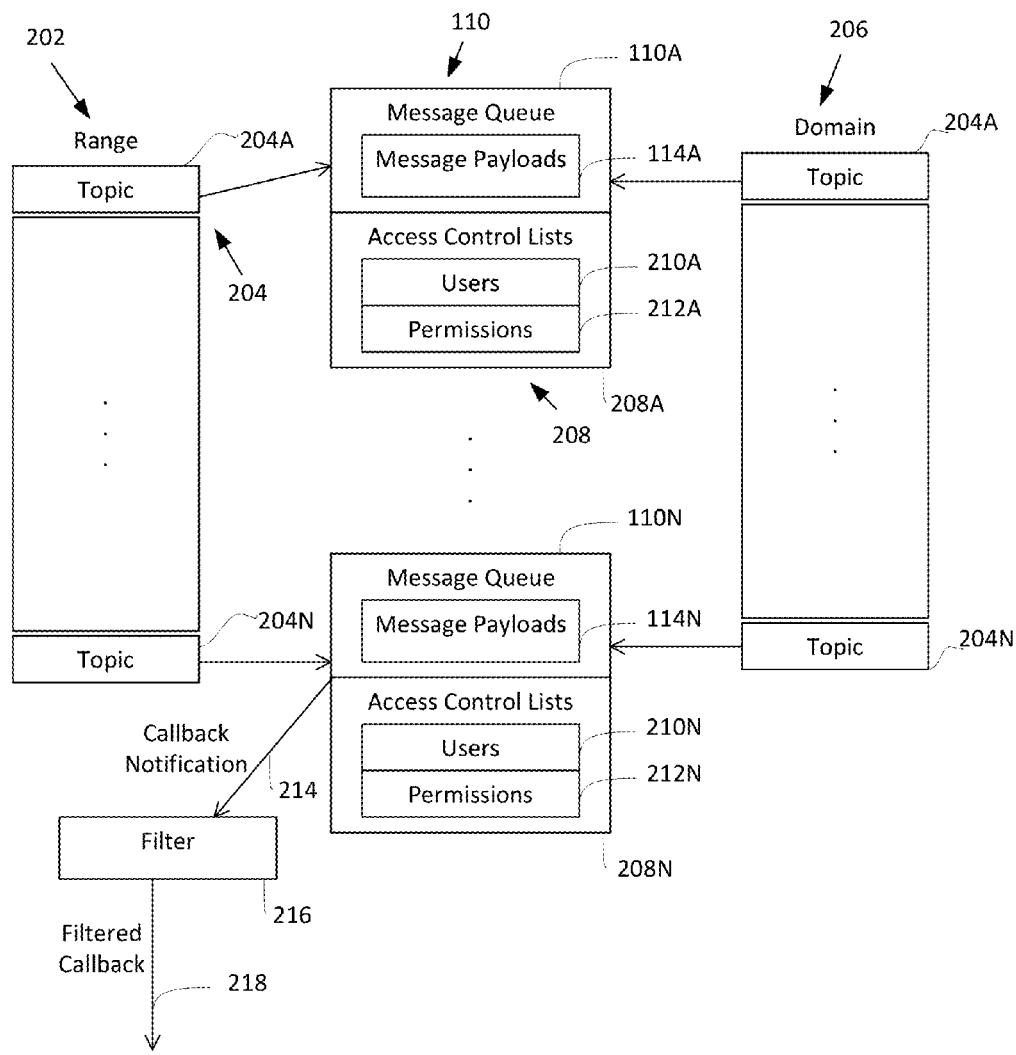
FIG. 2 depicts an example of topic to message queue mapping according to an embodiment.

FIG. 2 depicts an example of topic to message queue mapping according to an embodiment. A range 202 is a list of topics 204 to which message payloads 114 can be published. A domain 206 is a list of topics 204 to which a user is allowed to subscribe. Each message queue 110 has access control lists (ACL) 208 that governs who can publish to it and who can subscribe to it. In the example of FIG. 2, topic 204A of range 202 and topic 204A of domain 206 map to message queue 110A and access control lists 208A, while topic 204N of range 202 and topic 204N of domain 206 map to message queue 110N and access control lists 208N. Message queue 110A can hold one group of message payloads 114A associated with topic 204A, and message queue 110N can hold another group of message payloads 114N associated with topic 204N, where each group of message payloads 114A-N can include multiple objects or sequences of partitioned files. The access control lists 208A can include user lists 210A with associated permissions 212A. The access control lists 208A can be further subdivided into a publisher list and a subscriber list (not depicted). Similarly, the access control lists 208N can include user lists 210N with associated permissions 212N, where the access control lists 208N can be further subdivided into a publisher list and a subscriber list (not depicted).

Other features may be defined in the access control lists 208A-N or associated with the access control lists 208A-N, such as notification preferences and/or filters. As one example, a callback notification 214 can be configured to notify one or more of the client consumer devices 104A-N of FIG. 1. Alternatively, the client consumer devices 104A-N can be configured to poll the message queues 110A-N based on mapping of topics 204. A filter 216 can be applied to the callback notification 214 to refine subscriptions to specific data within a topic 204 as filtered callback data 218.

Figure 3:
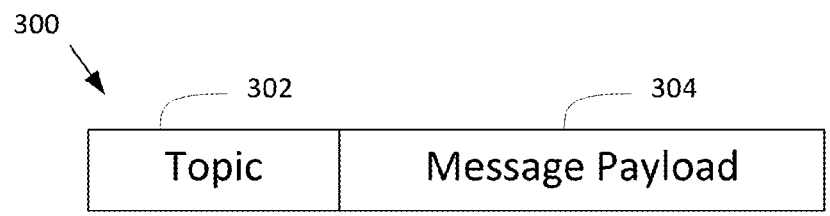
FIG. 3 depicts an example of a message format according to an embodiment.

FIG. 3 depicts an example of a message format 300 according to an embodiment. In the embodiment of FIG. 3, the message format 300 includes a topic field 302 and a message payload field 304. The topic field 302 may be used for each of the topics 204 of FIG. 2 when the message format 300 is used to send the sequence of messages 113 of FIG. 1. The topic field 302 can hold alpha-numeric characters to support topic-specific publishing and subscriptions. The message payload field 304 is the content to be delivered, which may be a combination of data formats defined according to a scheme. Messages according to the message format 300 may be published to the message switch 102 of FIG. 1 for client consumer devices 104A-N subscribed to a corresponding topic defined in the topic field 302.

Figure 4:
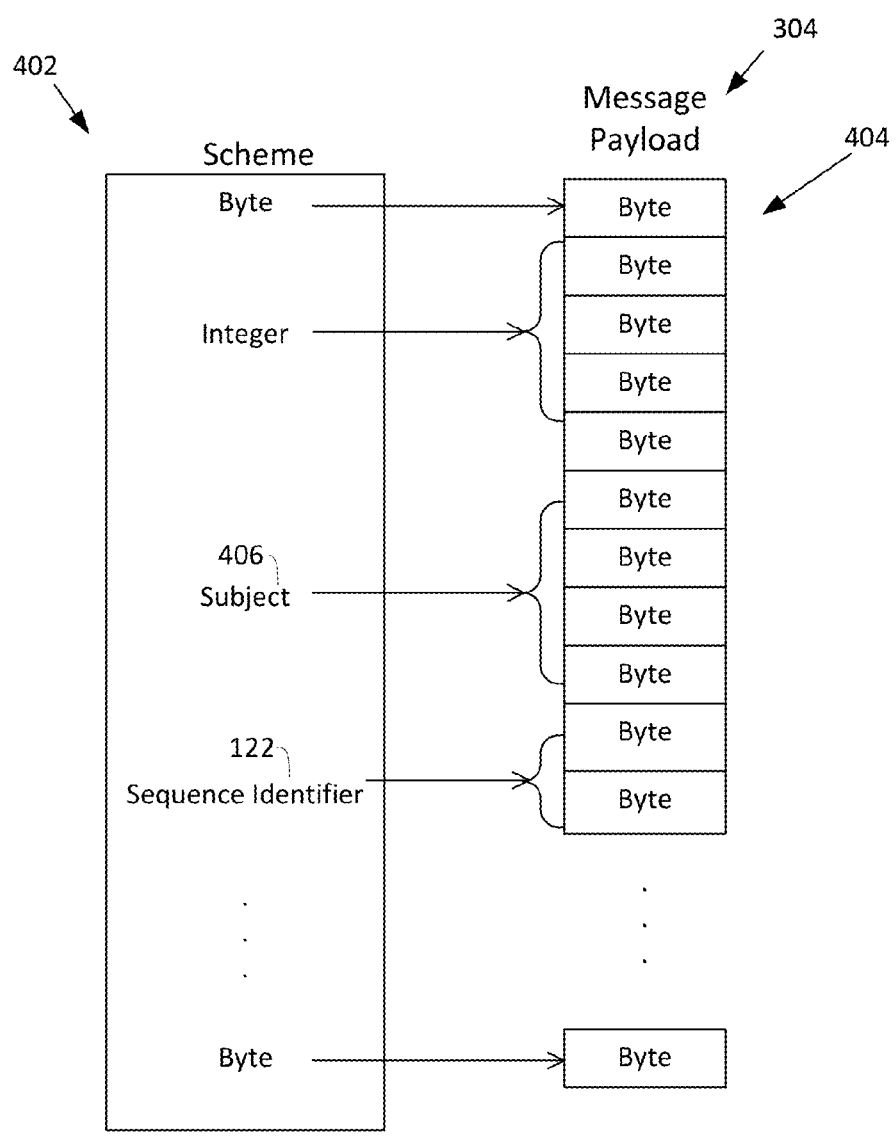
FIG. 4 depicts an example of a scheme to payload mapping according to an embodiment.

FIG. 4 depicts an example of a scheme to payload mapping according to an embodiment. A scheme 402 defines formatting to interpret a sequence of bytes 404 in the message payload field 304 of FIG. 3. For example, the scheme 402 can define locations of general data types such as bytes, integers, character strings, and the like, as well as a subject field 406 and the sequence identifier 122. The subject field 406 can be populated in message payloads 114 of FIG. 1 in the sequence of message payloads 115 of FIG. 1 to as payload subjects to describe a file. By fetching payload subjects from the payload subject field 406 in the message queue 110 of FIG. 1, the client consumer devices 104A-N can discover current contents stored in the message queue 110 of FIG. 1 prior to fetching the sequence of message payloads 115 of FIG. 1.

Figure 5:
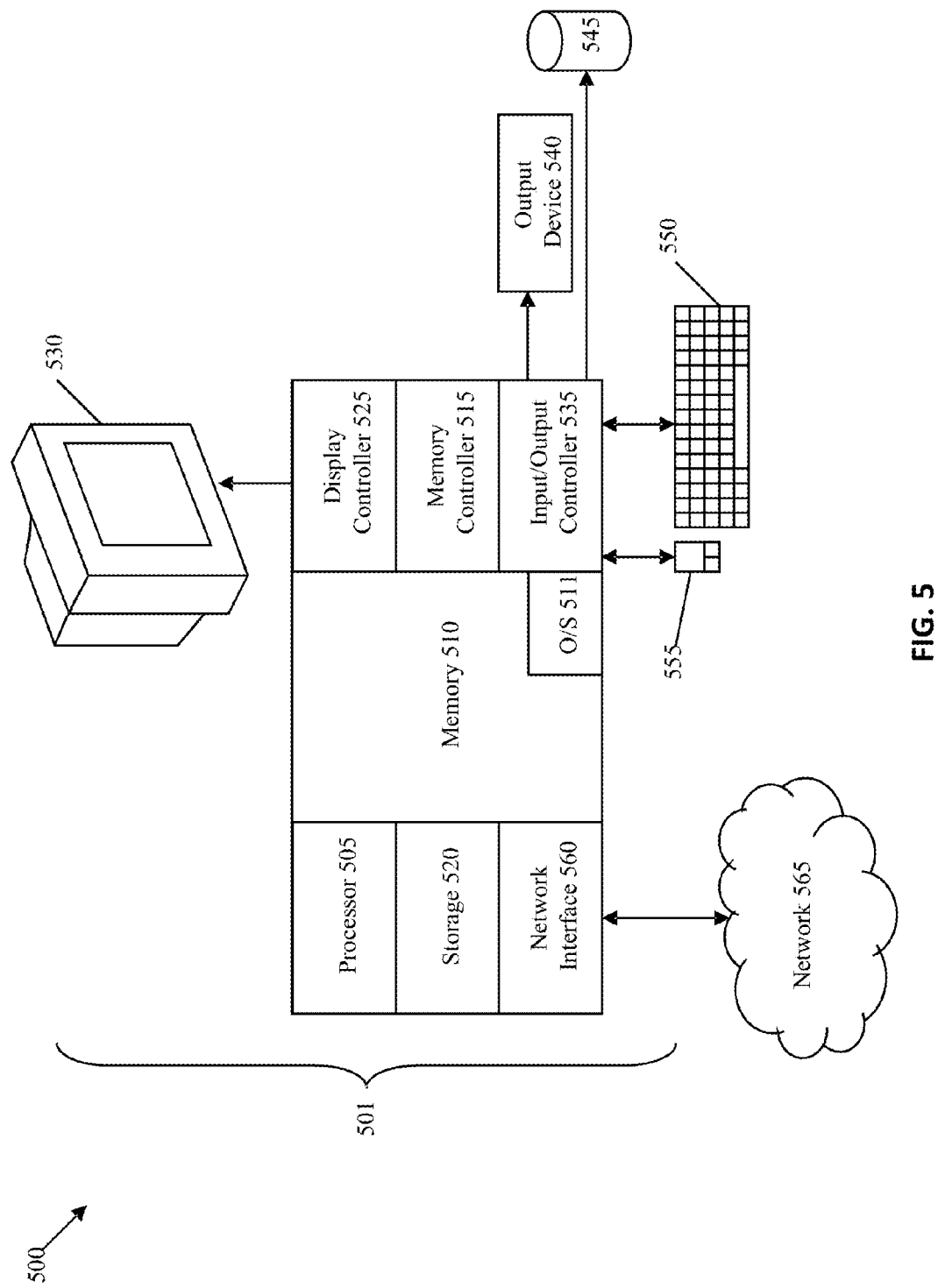
FIG. 5 depicts a further example of a block diagram of a system for message switch file sharing.

FIG. 5 illustrates a block diagram of a system 500 for message switch file sharing. The processes as previously described can be implemented in system 500 in hardware, software (e.g., firmware), or a combination thereof as part of a special or general-purpose digital computer, such as a personal computer, workstation, minicomputer, or mainframe computer. The system 500 therefore includes general-purpose computer 501 as illustrated in FIG. 5. The system 500 is a further example of the system 100 of FIG. 1, where the general-purpose computer 501 is an embodiment of the message switch 102, the client producer devices 103A-N, and/or the client consumer devices 104A-N of FIG. 1.

In an exemplary embodiment, in terms of hardware architecture, as shown in FIG. 5, the computer 501 includes a computer processor 505 and memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 505 is a processing device for executing software, particularly software stored in storage 520, such as cache storage, or memory 510. The computer processor 505 can be any custom made or commercially available computer processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the computer processor 505.

When the message switch 102 of FIG. 1 is embodied as the computer 501, the message queue 110 of FIG. 1 can be located in the memory 510 and distributed in different types of the memory 510 based on access frequency. For example, objects or message payloads 114 of FIG. 1 that are recently written or accessed can be stored in faster volatile memory, while less recently accessed data is stored to solid-state nonvolatile memory, and even less recently accessed data is stored to a spinning disk medium. As the sequence of message payloads 115 of FIG. 1 is accessed, the message switch 102 of FIG. 1 can predictively move older message payloads 114 that are part of the same object or file being accessed from spinning disk or solid-state nonvolatile memory to volatile memory in the memory 510 prior to the older message payload 114 being requested to reduce access time.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565, such as network 106 of FIG. 1. The network 565 can be an IP-based network for communication between the computer 501 and any external server, client and the like via a broadband connection. The network 565 transmits and receives data between the computer 501 and external systems. In an exemplary embodiment, network 565 can be a managed Internet Protocol (IP) network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the computer processor 505 is configured to execute instructions stored within the memory 510, to communicate data to and from the memory 510, and to generally control operations of the computer 501 pursuant to the instructions.

Figure 6:
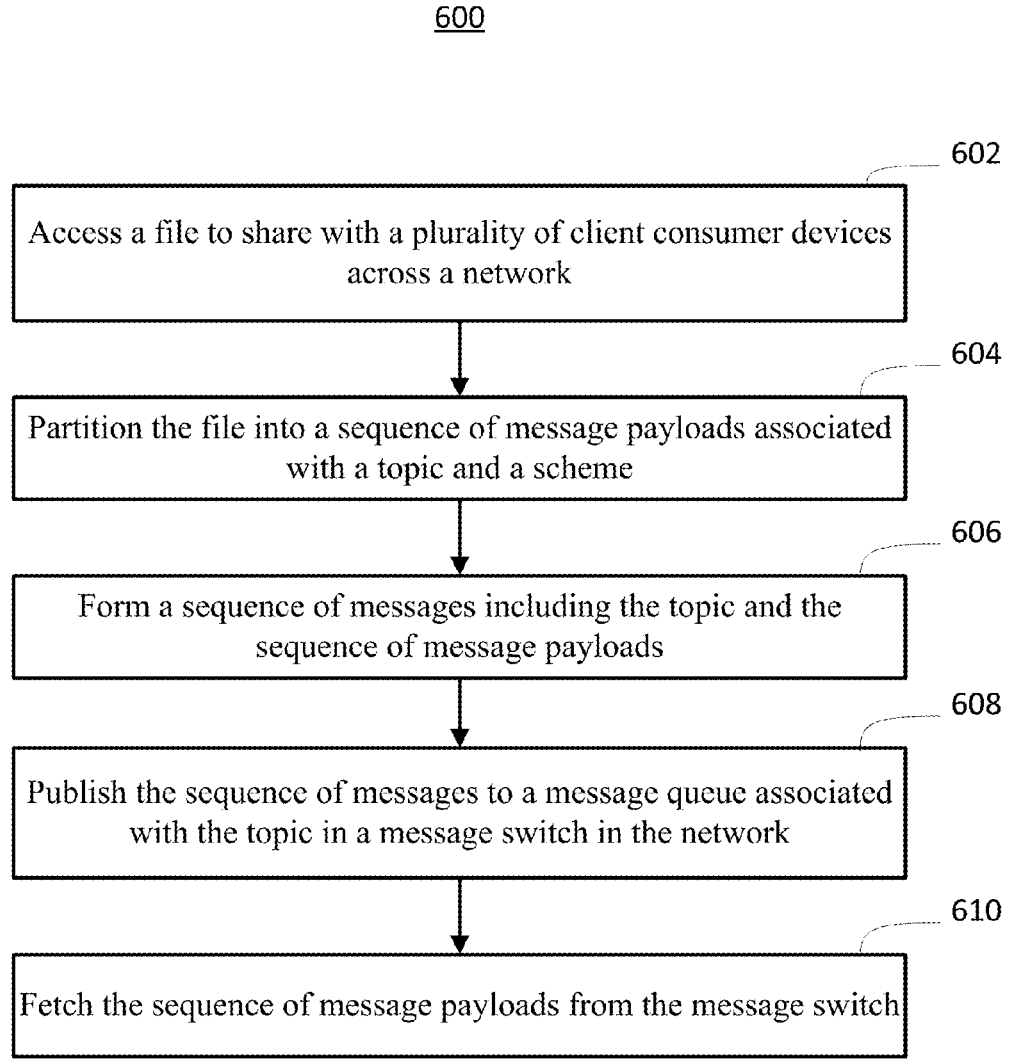
FIG. 6 depicts a flow diagram of a process for message switch file sharing according to an embodiment.

Turning now to FIG. 6, a process 600 for message switch file sharing will be described in accordance with an exemplary embodiment. The process 600 is described in reference to FIGS. 1-6 and can be implemented by the message switch 102 of FIG. 1. When embodied in the computer 501 of FIG. 5, a computer processor 505 of one of the client producer devices 103A-N can be configured to perform the process 600 as client producer 124.

At block 602, the client producer 124 accesses a file to share with a plurality of client consumer devices 104A-N across the network 106. The file can be from data objects 126 or files 128. For example, the file can be a data object having a size greater than an individual message payload size.

At block 604, the client producer 124 partitions the file into a sequence of message payloads 115 associated with a topic and a scheme. The scheme, such as scheme 402 of FIG. 4, defines a sequence identifier 122 to establish an order to reassemble the sequence of message payloads 115 into the file. The scheme can further include a subject field 406 to describe payload contents of message payloads 114 in message payload field 304. The client producer 124 is further configured to populate the subject field 406 in the sequence of message payloads 115 as payload subjects to describe the file.

At block 606, the client producer 124 forms a sequence of messages 113 including the topic 204 and the sequence of message payloads 115. At block 608, the client producer 124 publishes the sequence of messages 113 to a message queue 110 associated with the topic 204 in a message switch 102 in the network 106. The message switch 102 provides the client consumer devices 104A-N with access to the sequence of message payloads 115 based on subscriptions to the topic 204.

Subscription information can be stored on the message switch 102 in one or more access control lists 208 associated with the message queue 110. The one or more access control lists 208 are configured by the client producer 124 to manage access to the topic 204. The one or more access control lists 208 can be analyzed across multiple topics 204 to discover producers, consumers, and shared content. A message notification from the message switch 102 to the client consumer devices 104A-N can be configured as a callback notification 214. A filter 216 may be applied to the callback notification 214 to refine subscriptions to specific data within the topic 204.

At block 610, a client consumer 134 fetches the sequence of message payloads 115 from the message switch 102. At least one of the client consumer devices 104A-N can be configured to fetch payload subjects from the subject fields 406 in message queue 110 to discover current contents stored in the message queue 110 prior to fetching the sequence of message payloads 115. The sequence of message payloads 115 can be presented to the client consumer devices 104A-N as a single object. The client consumer devices 104A-N may be configured to fetch the sequence of message payloads 115 from the message switch 102 as either individual message payloads 114 or as a single object.

Technical effects include partitioning large files or data objects into a number of message payloads and providing the message payloads in a sequence of messages to a message switch. Sequence identifier and subject data can be used to analyze and fetch a sequence of message payloads from the message switch as individual message payloads or a single data object. Publish and subscribe features can be managed by content publishers using access control lists, rather than relying upon a system administrator of the message switch.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system for message switch file sharing, the system comprising:
   a client producer device configured to communicate with a message switch in a network,
   the client producer device comprising a computer processor configured to:
   access a file to share with a plurality of client consumer devices across the network;
   partition the file into a sequence of message payloads associated with a topic and a scheme, the scheme defining a sequence identifier to establish an order to reassemble the sequence of message payloads into the file;
   form a sequence of messages comprising the topic and the sequence of message payloads; and
   publish the sequence of messages to a message queue associated with the topic in the message switch in the network, the message switch providing the client consumer devices with access to the sequence of message payloads based on subscriptions to the topic, wherein subscription information of the subscriptions is stored on the message switch in one or more access control lists associated with the message queue, the message queue is one of a plurality of message queues in the message switch, each of the message queues mapped to a single topic of a plurality of topics, each of the message queues having separate instances of the one or more access control lists, and the one or more access control lists are configured through the client producer device to manage access to the topic, wherein the one or more access control lists comprise user lists with associated permissions and are subdivided into a publisher list and a subscriber list, and further wherein the client producer device is configured to define a callback notification and a filter in the one or more access control lists.

2. The system of claim 1, wherein the scheme further comprises a subject field to describe payload contents and defines location of data types, and the client producer device is further configured to populate the subject field in the sequence of message payloads as payload subjects to describe the file.

3. The system of claim 2, wherein at least one of the client consumer devices is configured to fetch the payload subjects from the message queue to discover current contents stored in the message queue prior to fetching the sequence of message payloads.

4. The system of claim 1, wherein the sequence of message payloads is presented to the client consumer devices as a single object; and the client consumer devices are configured to fetch the sequence of message payloads from the message switch as either individual message payloads or as the single object.

5. The system of claim 1, wherein the file is a data object having a size greater than an individual message payload size.

6. The system of claim 1, wherein the one or more access control lists are analyzed across multiple topics to discover producers, consumers, and shared content.

7. The system of claim 1, wherein a message notification from the message switch to the client consumer devices is configured as the callback notification; and the filter is applied to the callback notification to refine subscriptions to specific data within the topic.

* * * * *